(12) United States Patent
Huang et al.

(10) Patent No.: US 11,615,613 B2
(45) Date of Patent: Mar. 28, 2023

(54) METHOD AND DEVICE FOR EXTRACTING SPATIAL RELATIONSHIP OF GEOGRAPHIC LOCATION POINTS

(71) Applicant: Beijing Baidu Netcom Science and Technology Co., Ltd., Beijing (CN)

(72) Inventors: Jizhou Huang, Beijing (CN); Hao Zhang, Beijing (CN); Haifeng Wang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 157 days.

(21) Appl. No.: 17/210,188

(22) Filed: Mar. 23, 2021

(65) Prior Publication Data
US 2022/0067372 A1 Mar. 3, 2022

(30) Foreign Application Priority Data
Aug. 26, 2020 (CN) .......................... 202010872307.6

(51) Int. Cl.
*G06V 20/10* (2022.01)
*G06T 7/70* (2017.01)
(Continued)

(52) U.S. Cl.
CPC .............. *G06V 20/10* (2022.01); *G06F 18/23* (2023.01); *G06F 18/24* (2023.01); *G06T 7/70* (2017.01); *G06V 10/40* (2022.01); *G06V 30/10* (2022.01)

(58) Field of Classification Search
CPC .......... G06V 20/10; G06V 10/40; G06T 7/70; G06K 9/6218; G06K 9/6267
See application file for complete search history.

(56) References Cited

U.S. PATENT DOCUMENTS 9,613,455 B1 4/2017 Nelson et al.
2010/0131197 A1* 5/2010 Zhang .................... G01C 21/36
382/104
(Continued)

FOREIGN PATENT DOCUMENTS

CN 1896684 A 1/2007
CN 108897824 A 11/2018
(Continued)

OTHER PUBLICATIONS

Extended European Search Report Issued in European Patent Application No. 21164470.3, dated Aug. 10, 2021, 7 Pages.
(Continued)

*Primary Examiner* — Shaghayegh Azima
(74) *Attorney, Agent, or Firm* — Kwan & Olynick LLP

(57) ABSTRACT

The present application discloses a method and apparatus for extracting a geographic location point spatial relationship, and relates to the field of big data technologies. A specific implementation solution is as follows: determining geographic location point pairs included in real-scene images by performing signboard recognition on the real-scene images collected by terminal devices; acquiring at least two real-scene images collected by the same terminal device and including the same geographic location point pair; and determining a spatial relationship of the same geographic location point pair by using shooting parameters of the at least two real-scene images. The geographic location point spatial relationship extracted through the present application has higher accuracy and a coverage rate.

14 Claims, 7 Drawing Sheets

(51) Int. Cl.
*G06V 10/40* (2022.01)
*G06F 18/23* (2023.01)
*G06F 18/24* (2023.01)
*G06V 30/10* (2022.01)

(56) References Cited

U.S. PATENT DOCUMENTS

| 2018/0045519 | A1  |  2/2018 | Ghadiok et al.              |
| 2018/0172454 | A1  |  6/2018 | Ghadiok et al.              |
| 2018/0322654 | A1  | 11/2018 | Chen et al.                 |
| 2019/0137280 | A1* |  5/2019 | Ghadiok ............ G06V 20/582 |
| 2020/0090375 | A1* |  3/2020 | Mori ................ G02B 27/01 |
| 2020/0211226 | A1* |  7/2020 | Kundu ............... G06T 7/85 |
| 2022/0245860 | A1* |  8/2022 | Atanasoaei ........... G06T 7/75 |
| 2022/0337731 | A1* | 10/2022 | Venkataraman ..... H04N 23/743 |

FOREIGN PATENT DOCUMENTS

| CN | 109543680   | A |  3/2019 |
| CN | 111583118   | A |  8/2020 |
| JP | H0944605    | A |  2/1997 |
| JP | 2001331803  | A | 11/2001 |
| JP | 2004110459  | A |  4/2004 |
| JP | 2006344005  | A | 12/2006 |
| JP | 2007150681  | A |  6/2007 |
| JP | 2013145176  | A |  7/2013 |
| JP | 2018013847  | A |  1/2018 |
| JP | 2019527832  | A | 10/2019 |
| KR | 20160010278 | A |  1/2016 |
| KR | 20170132414 | A | 12/2017 |
| KR | 20180055158 | A |  5/2018 |

OTHER PUBLICATIONS

First Office Action for KR10-2021-0039192, dated Jun. 13, 2022, 7 pages.
First Office Action for CN202010872307.6 dated Jul. 3, 2022, 9 pages.
First Office Action for JP2021-137058, dated Oct. 25, 2022, 3 pgs.
Notice of Allowance for CN202010872307.6, dated Nov. 25, 2022, 4 pgs.

* cited by examiner

METHOD AND DEVICE FOR EXTRACTING SPATIAL RELATIONSHIP OF GEOGRAPHIC LOCATION POINTS

The present application claims the priority of Chinese Patent Application No. 202010872307.6, filed on Aug. 26, 2020, with the title of "Method and apparatus for extracting geographic location point spatial relationship". The disclosure of the above application is incorporated herein by reference in its entirety.

FIELD OF THE DISCLOSURE

The present application relates to the field of computer application technologies, and particularly to a method and apparatus for extracting a geographic location point spatial relationship in the field of big data technologies.

BACKGROUND OF THE DISCLOSURE

A main goal of maps is to depict the real world and make travel easier for users. A high-precision knowledge graph of geographic location points is the foundation to satisfy user's core demands such as finding points on the maps and traveling. A geographic location point spatial relationship is one of the essential elements of the knowledge graph, which can achieve auxiliary description of geographic location points and more accurate logical reasoning query.

SUMMARY OF THE DISCLOSURE

In view of this, the present application provides a method and apparatus for extracting a geographic location point spatial relationship, a device and a computer storage medium.

In a first aspect, the present application provides a method for extracting a geographic location point spatial relationship, including:

determining geographic location point pairs included in real-scene images by performing signboard recognition on the real-scene images collected by terminal devices;

acquiring at least two real-scene images collected by the same terminal device and including the same geographic location point pair; and determining a spatial relationship of the same geographic location point pair by using shooting parameters of the at least two real-scene images.

In a second aspect, the present application provides an electronic device, comprising:

at least one processor; and a memory communicatively connected with the at least one processor;

wherein the memory stores instructions executable by the at least one processor, and the instructions are executed by the at least one processor to enable the at least one processor to perform a method for extracting a geographic location point spatial relationship, wherein the method comprises:

determining geographic location point pairs included in the real-scene images by performing signboard recognition on real-scene images collected by terminal devices;

acquiring at least two real-scene images collected by the same terminal device and including the same geographic location point pair; and determining a spatial relationship of the same geographic location point pair by using shooting parameters of the at least two real-scene images.

In a third aspect, the present application further provides a non-transitory computer readable storage medium with computer instructions stored thereon, wherein the computer instructions are used for causing a computer to perform a method for extracting a geographic location point spatial relationship, wherein the method comprises:

determining geographic location point pairs comprised in real-scene images by performing signboard recognition on the real-scene images collected by terminal devices;

acquiring at least two real-scene images collected by the same terminal device and comprising the same geographic location point pair; and determining a spatial relationship of the same geographic location point pair by using shooting parameters of the at least two real-scene images.

Effects of the above options will be described below with reference to specific embodiments.

BRIEF DESCRIPTION OF DRAWINGS

The accompanying drawings are intended to better understand the solution and do not constitute limitations on the present application. In the drawings.

DETAILED DESCRIPTION OF PREFERRED EMBODIMENTS

Exemplary embodiments of the present application are described below with reference to the accompanying drawings, including various details of the embodiments of the present application to facilitate understanding, and they should be considered as exemplary only. Therefore, those of ordinary skill in the art should be aware that the embodiments described herein may be changed and modified in various ways without deviating from the scope and spirit of the present application. Similarly, for the sake of clarity and simplicity, descriptions of well-known functions and structures are omitted in the following description.

At present, there are mainly two following methods to determine a geographic location point spatial relationship:

The first method is to automatically generate the geographic location point spatial relationship by using geographic location points reported by a device with a positioning function. However, the method relies on the accuracy of coordinates, and a coordinate error of the geographic location points is generally tens of meters or even more than one hundred meters, resulting in the inaccuracy of the geographic location point spatial relationship generated by the method.

For example, an error of tens of meters or even hundreds of meters may result in an error in the geographic location point spatial relationship even across several streets.

In another example, since coordinate information reported by different devices for the same geographic location point may have certain errors or different precision, if geographic location points with the same name in a certain range are arbitrarily de-weighted, chain mechanisms originally close to each other may be accidentally injured.

The second method is to manually label the geographic location point spatial relationship, but this method is inefficient and has limited coverage.

In view of this, the core idea of the present application is to determine geographic location points included in images by means of signboard recognition and determine, by using shooting parameters of at least two images collected by the same terminal device and including the same geographic location point pair, a spatial relationship of the same geographic location point pair. The present application is described in detail below with reference to embodiments.

Embodiment 1

Figure 1:
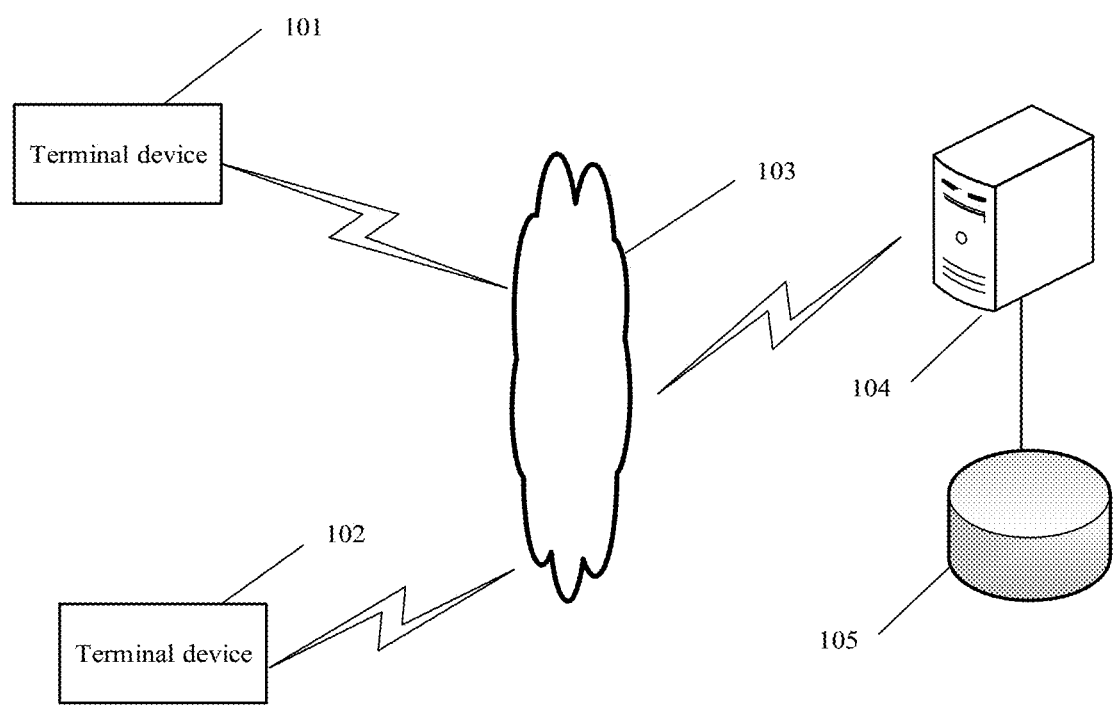
FIG. 1 is an exemplary system architecture to which Embodiment 1 of the present application can be applied.

FIG. 1 illustrates an exemplary system architecture of a method or an apparatus to which embodiments of the present application can be applied. As shown in FIG. 1, the system architecture may include terminal devices 101 and 102, a network 103 and a server 104. The network 103 is a medium for providing communication links among the terminal devices 101, 102, and the server 104. The network 103 may include various types of connections, such as wired, wireless communication links, or fiber optic cables.

A user may use the terminal devices 101 and 102 to interact with the server 104 through the network 103. Various applications such as map applications, webpage browser applications, and communication applications may be installed on the terminal devices 101 and 102.

The terminal devices 101 and 102 may be a variety of user devices capable of running map applications, which include, but are not limited to, smart phones, tablets, PCs, smart TVs, and so on. The apparatus for extracting a geographic location point spatial relationship according to the present application may be arranged and run in the server 104 or run in a device independent of the server 104. The apparatus may be implemented as a plurality of software or software modules (for example, to provide distributed services), or as a single software or software module, which is not specifically limited herein. The server 104 may interact with a map database 105. Specifically, the server 104 may acquire data from the map database 105 or store data in the map database 105. Map data including POI information is stored in the map database 105.

For example, the apparatus for extracting a geographic location point spatial relationship is arranged and runs in the server 104. The server 104 uses the method according to the embodiment of the present application to extract the geographic location point spatial relationship, and then updates the map database 105 by using the acquired geographic location point spatial relationship. The server 104 can respond to a query request of the terminal devices 101 and 102 to query the map database 105, and return relevant information of a queried geographic location point, including information generated based on the geographic location point spatial relationship, to the terminal devices 101 and 102.

The server 104 may be either a single server or a server cluster consisting of a plurality of servers. In addition to existing in the form of a server, the server 104 may also be other computer systems or processors with high computational performance. It shall be understood that the number of the terminal devices, the network, the server and the database in FIG. 1 is only schematic. According to implementation requirements, there may be any number of terminal devices, networks, servers and databases.

The geographic location points involved in the present application refer to geographic location points in map applications. The geographic location points may be searched and browsed by users and displayed to the users, and so on. The geographic location points are described with basic attributes such as latitude and longitude, names, administrative addresses, and types. The geographic location points may include, but are not limited to, a Point Of Interest (POI), an Area Of Interest (AOI), a Region Of Interest (ROI), and so on. POI is described as an example in subsequent embodiments. POI is a term used in geographic information systems, generally refers to any geographic object that may be abstracted as a point. A POI may be a house, a shop, a post box, a bus stop, a school, a hospital, and so on. A main purpose of POI is to describe positions of things or events, so as to enhance the capability to describe and query the positions of the things or events.

Embodiment 2

Figure 2:
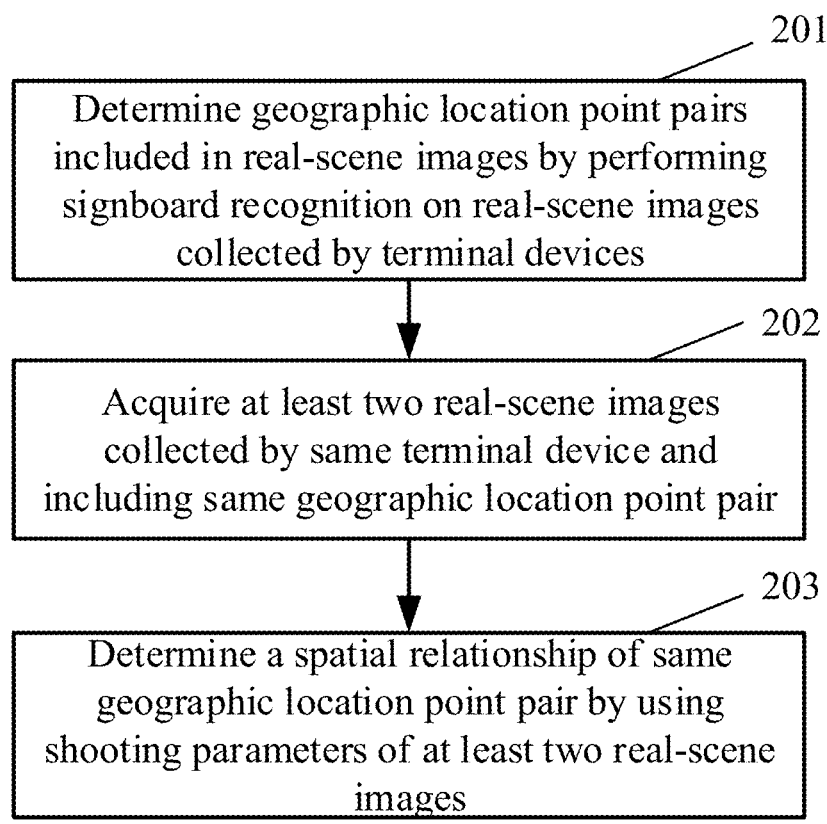
FIG. 2 is a main flow chart of a method according to Embodiment 2 of the present application.

FIG. 2 is a main flow chart of a method according to Embodiment 2 of the present application. As shown in FIG. 2, the method may include the following steps:

In 201, it determines geographic location point pairs comprised in real-scene images by performing signboard recognition on the real-scene images collected by terminal devices.

In the present application, a spatial relationship between geographic location points is determined by using real-scene images of the geographic location points shot by terminal devices. Therefore, after the real-scene images collected by the terminal devices are acquired, signboard recognition may be performed on the real-scene images to screen out real-scene images including at least two signboards. Then, signboard text recognition is performed on the real-scene images including at least two signboards, and geographic location point pairs included in the real-scene images are determined. The geographic location point pair involved in the present application consists of two different geographic location points.

The real-scene images refer to images of geographic location points shot by the terminal devices in the field. The real-scene images used in the present application need to include at least two signboards, so as to subsequently utilize shooting parameters of the real-scene images to determine a spatial relationship between geographic location points corresponding to two signboards. The so-called signboard refers to a board that hangs in front of a building corresponding to a geographic location point to serve as a sign, for example, a shop name signboard hanging at the door of a shop, a signboard of a school name at the door of a school, and so on.

Figure 3:
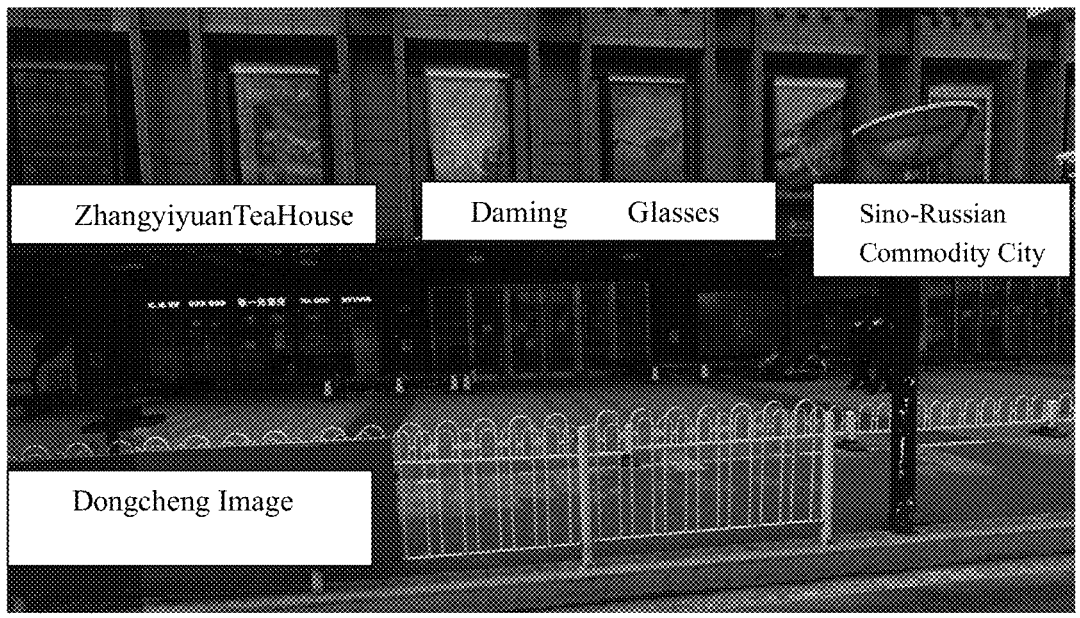
FIG. 3 is an example diagram of real-scene images according to Embodiment 2 of the present application.

This step is actually a process of mining a geographic location point pair from a real-scene image, for example, a geographic location point pair (Zhangyiyuan Tea House, Daming Glasses) is mined from a real-scene image shown in FIG. 3. Specific implementation of the part will be described in detail in subsequent Embodiment 3.

In 202, it acquires at least two real-scene images collected by the same terminal device and comprising the same geographic location point pair.

After the geographic location point pairs of the real-scene images are mined, reverse indexes of the real-scene images may be established by using the geographic location point pairs. In this step, real-scene images of the same geographic location point pair can be acquired by looking for the reverse indexes, but it is necessary to ensure that the acquired real-scene images are collected by the same terminal device and the number is at least two.

In 203, it determines a spatial relationship of the same geographic location point pair by using shooting parameters of the at least two real-scene images.

The shooting parameters involved in this step mainly include:

1) Positioning coordinates of the real-scene images, that is, coordinates of shooting points for shooting the real-scene images. Generally, when the terminal devices shoot images, current positioning coordinates of the terminal devices may be acquired as positioning coordinates of the shot images.

2) Shooting angles and shooting distances for signboards of the geographic location point pairs in the real-scene images.

Due to setting or functional reasons of shooting devices, some real-scene images have the above shooting parameters, while some real-scene images do not have the above shooting parameter. In the present application, only real-scene images with the above shooting parameters are acquired and used to determine the spatial relationship of the geographic location point pairs.

In this step, the above shooting parameters of the real-scene images are mainly used to calculate coordinates of two geographic location points in a geographic location point pair based on geometrical relationships such as the law of sines and the law of cosines. A spatial relationship between the two geographic location points is determined based on the coordinates of the two geographic location points.

Information of the spatial relationship involved in the embodiment of the present application may include: types and values of the spatial relationship. The types of the spatial relationship mainly include some spatial relationship types in orientation, for example, east, south, west, north, southeast, northeast, southwest, northwest, left, right, upstairs, downstairs, and so on. The values may include values for distance, floors, and so on. It can be seen that the spatial relationship of the geographic location points is relative.

Specific implementations of the above method are described in detail below with reference to Embodiment 3.

Embodiment 3

Figure 4:
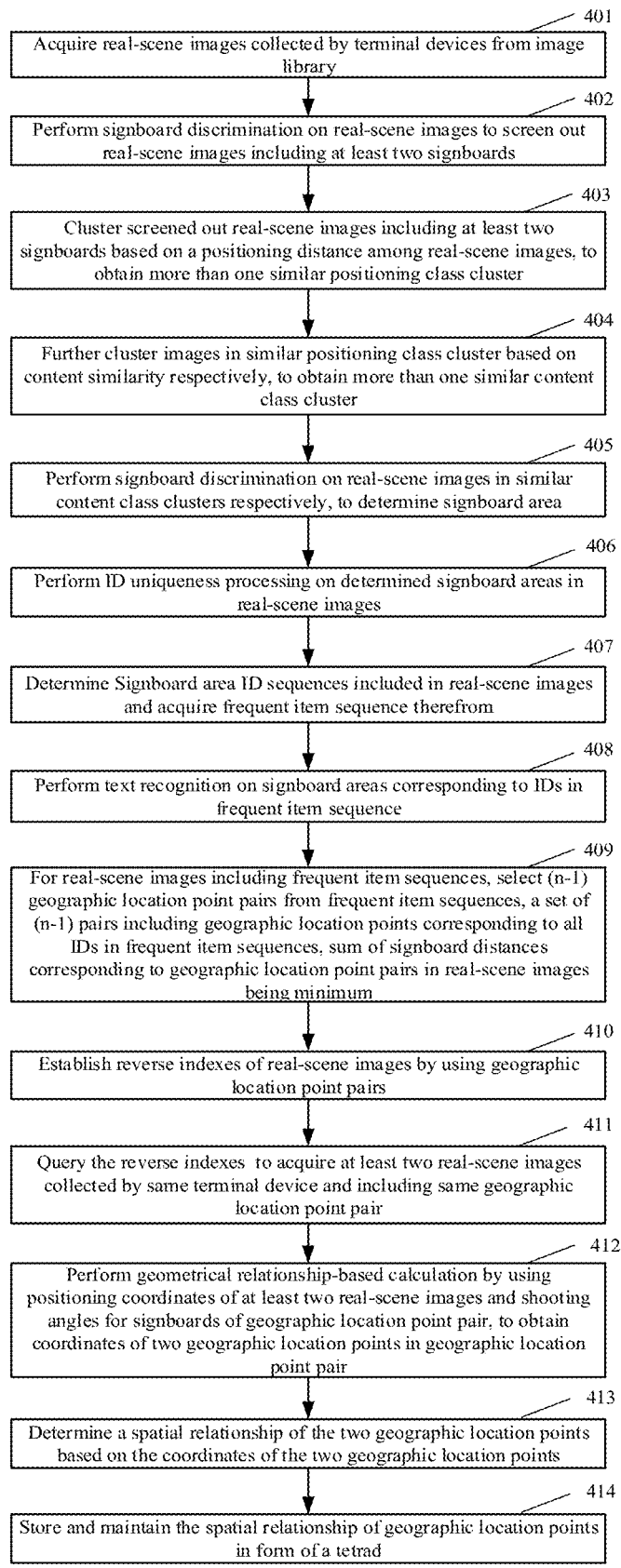
FIG. 4 is a detailed flow chart of a method according to Embodiment 3 of the present application.

FIG. 4 is a detailed flow chart of a method according to Embodiment 3 of the present application. As shown in FIG. 4, the method may include the following steps:

In 401, real-scene images collected by terminal devices are acquired from an image library.

Real-scene images collected and reported by the terminal devices may be stored in an image library. The image library is the basis of extracting the geographic location point spatial relationship in the present application. Some of the real-scene images stored in the image library have shooting parameters, some do not have shooting parameters, some may have part of the shooting parameters, and so on. In the present embodiment, real-scene images used in a process of mining a geographic location point pair from the real-scene images have at least positioning coordinate information of the real-scene images, and may be further required to have shooting time information. In subsequent determination of the geographic location point spatial relationship, the real-scene images are further required to have information such as shooting angles.

In 402, signboard discrimination is performed on the real-scene images to screen out real-scene images including at least two signboards.

For a large number of real-scene images taken by the terminal devices, there may be some real-scene images that do not include signboards or include only one signboard. Such real-scene images cannot be used to determine the geographic location point spatial relationship in the present application. Therefore, the real-scene images including at least two signboards need to be screened out.

When signboard discrimination is performed on the real-scene images, a pre-trained signboard discrimination model may be used. Firstly, the real-scene images are regionally classified. Since signboards in the real-scene images are respectively a closed region in general, the real-scene images can be regionally recognized and classified. A determined closed region is input to the signboard discrimination model, and the signboard discrimination model outputs a discrimination result indicating whether the closed region is a signboard area.

The signboard discrimination model is actually a classification model. Some real-scene images can be pre-collected to mark signboard areas and non-signboard areas as positive and negative samples respectively, and then the signboard discrimination model can be obtained by training the classification model.

In 403, the screened out real-scene images including at least two signboards are clustered based on a positioning distance among the real-scene images, to obtain more than one similar positioning class cluster.

When the terminal devices shoot images of the same geographic location points, shooting positions are usually close. Therefore, during extraction, it is considered to extract geographic location point pairs from real-scene images close in shooting position, which, on the one hand, reduces the calculation amount, and on the other hand, excludes some special cases where signboards included in some real-scene images are the same but shooting positions vary greatly. For example, a terminal device shoots a real-scene image including signboards of "HomeLink" and "Aesthetic Beauty Salon" in Beijing Xidan commercial circle, and shoots a real-scene image also including signboards of "HomeLink" and "Aesthetic Beauty Salon" in Beijing Shangdi commercial circle. Since signboards of chain stores are the same or similar, it would obviously be a mistake to use these two real-scene images to determine a spatial relationship between the two geographic location points of HomeLink and Aesthetic. Therefore, as one preferred implementation, the real-scene images can be clustered based on a positioning distance among the real-scene images, to obtain more than one similar positioning class cluster, so that the real-scene images with similar positioning coordinates are clustered into one class to extract the geographic location points therefrom. That is, the real-scene images included in the similar positioning class cluster are all close in shooting position.

The present application does not limit the specific manner for clustering, which may be K-means, Density-Based Spatial Clustering of Applications with Noise (DBSCAN), a Gaussian Mixed Model (GMM), and so on.

In 404, images in the similar positioning class cluster are further clustered based on content similarity respectively, to obtain more than one similar content class cluster.

This step is actually extracting real-scene images including the same geographic location points from real-scene images close in shooting position. The clustering is performed for the similar positioning class clusters respectively.

Similarity among images may be calculated based on features of the images. For example, rotation-invariant and scale-invariant features may be extracted from the images by using, such as, Harris Corner, a Scale-invariant feature transform (SIFT) algorithm, or a Speeded Up Robust Features (SURF) algorithm. Then, the similarity among the features is determined by calculating similarity among the extracted features. The images meeting requirements of the similarity are clustered into one class.

In some cases, geographic location points may change over time, for example, the opening of certain stores, the relocation of certain stores, and so on. In order to ensure that acquired geographic location point information is up-to-date, in this step, the images in the similar positioning class cluster may be classified respectively according to shooting time, to obtain images shot in each time period; then images shot in the most recent time period are selected; and the images shot in the most recent time period in the same similar positioning class cluster are clustered based on content similarity.

In 405, signboard discrimination is performed on real-scene images in the similar content class clusters respectively, to determine signboard areas.

The manner of performing signboard discrimination in this step is similar to that in step 402, and is not repeated herein.

In 406, ID uniqueness processing is performed on the determined signboard areas in the real-scene images.

The ID uniqueness processing is intended to make signboard areas referring to the same signboard in the real-scene images use the same ID. The signboard areas referring to the same signboard may be calculated based on similarity. Similarity calculation may also be extracting rotation-invariant and scale-invariant features from the signboard areas. For example, the features are extracted by using a Harris Corner, SIFT or SURF algorithm. Then similarity among the signboard areas is determined by calculating similarity among the extracted features. If the similarity among the signboard areas exceeds a preset similarity threshold, it is considered that the signboard areas refer to the same signboard and use the same ID. Signboard areas referring to different signboards use different IDs. The manner of allocating IDs is not limited in the present application.

In 407, signboard area ID sequences included in the real-scene images are determined and a frequent item sequence is acquired therefrom.

For each real-scene image, IDs of the signboard areas may be arranged in a preset arrangement order to obtain a signboard area ID sequence of the real-scene image. For example, an order preferentially from left to right with the assistance of from top to bottom is adopted. For example, the IDs of the signboard areas may be arranged from left to right according to pixel positions in an upper left corner of the signboard areas. If pixel positions of more than two signboard areas are the same in a vertical direction, IDs of the more than two signboard areas are arranged in order from top to bottom. Certainly, in addition to being according to the pixel positions in the upper left corner of the signboard areas, the arrangement may also be performed according to other pixel positions, for example, uniformly according to center point positions of the signboard areas, provided that mainly used pixel positions are unified. After the above serialization processing, all the real-scene images in the similar content class cluster have a signboard area ID sequence respectively. A sequence pattern mining algorithm may be used to mine the signboard area ID sequences of all the real-scene images in the similar content class cluster to obtain a frequent item sequence. If only one frequent item sequence exists, the frequent item sequence is retained. If a plurality of frequent item sequences exist, a frequent item sequence occurring most frequently may be acquired. It is assumed that each frequent item sequence is denoted as $<ID_1, ID_2, ID_3, ID_4, \ldots, ID_n>$, and n is the number of Ids included in the frequent item sequence.

The sequence pattern mining algorithm may be, but is not limited to, an Apriori algorithm (correlation analysis original mining algorithm), a FreeSpan algorithm (frequent pattern projection mining algorithm), a PrefixSpan algorithm (another algorithm evolved from FreeSpan), and so on. The sequence pattern mining algorithm is a mature algorithm, and thus is not described in detail herein.

In 408, text recognition is performed on signboard areas corresponding to IDs in the frequent item sequence.

Text recognition methods may be OCR (Optical Character Recognition) and other mature text recognition methods. If a plurality of text recognition results are recognized for signboard areas corresponding to the same ID in the frequent item sequence, one with the highest confidence is selected from the plurality of text recognition results.

The text recognition result with the highest confidence may be determined based on the number of occurrence or the frequency of occurrence. For example, the one that appears most frequently among the plurality of text recognition results corresponding to the same ID may be taken as the text recognition result of the ID. The text recognition result with the greatest number of occurrence corresponding to the frequent item sequence may also be determined with the sequence pattern mining algorithm.

The text recognition results obtained by the frequent item sequence $<ID_1, ID_2, ID_3, ID_4, \ldots, ID_n>$ may be expressed as $(ID_1, TEXT_1), (ID_2, TEXT_2), (ID_3, TEXT_3), (ID_4, TEXT_4), \ldots, (ID_n, TEXT_n)>$.

TEXT represents a text recognition result.

In 409, for real-scene images including frequent item sequences, n−1 geographic location point pairs are selected from the frequent item sequences, a set of the n−1 geographic location point pairs includes geographic location points corresponding to all IDs in the frequent item sequences, the sum of signboard distances corresponding to the geographic location point pairs in the real-scene images is minimum, and the n is the number of signboards included in the frequent item sequences.

For example, it is assumed that one frequent item sequence includes four signboard IDs: $ID_1, ID_2, ID_3, ID_4$. The four signboard Ids may be combined into a variety of combinations of geographic location point pairs. There are a lot of combinations. However, in the preferred manner adopted in step 409 of the present application, a combination of the selected geographic location point pairs is $<(ID_1, ID_2), (ID_2, ID_3), (ID_3, ID_4)>$. Such a combination includes all the four signboard IDs, and the sum of a signboard distance corresponding to $ID_1$ and $ID_2$, a signboard distance corresponding to $ID_2$ and $ID_3$, and a signboard distance corresponding to $ID_3$ and $ID_4$ is minimum. A spatial relationship between other geographic location point pairs may actually be deduced from these closest geographic location point pairs. For example, if a spatial relationship between geographic location points corresponding to $ID_1$ and $ID_2$ a spatial relationship between geographic location points corresponding to $ID_2$ and $ID_3$ are determined, a spatial relationship between geographic location points corresponding to $ID_1$ and $ID_3$ can be deduced.

In this step, the geographic location point pairs are selected based on closest geographic location pairs, which can minimize the calculation amount and improve the calculation efficiency. However, it is easy to understand that other selection manners may also be adopted.

In 410, reverse indexes of the real-scene images are established by using the geographic location point pairs.

After establishment of the reverse indexes, real-scene images including a geographic location point can be quickly queried for through the geographic location point.

In 411, the reverse indexes are queried to acquire at least two real-scene images collected by the same terminal device and including the same geographic location point pair.

The acquired real-scene images are all required to have shooting parameters such as positioning coordinate information and shooting angles of the real-scene images.

In 412, geometrical relationship-based calculation is performed by using positioning coordinates of the at least two real-scene images and shooting angles for signboards of the geographic location point pair, to obtain coordinates of two geographic location points in the geographic location point pair.

Figure 5:
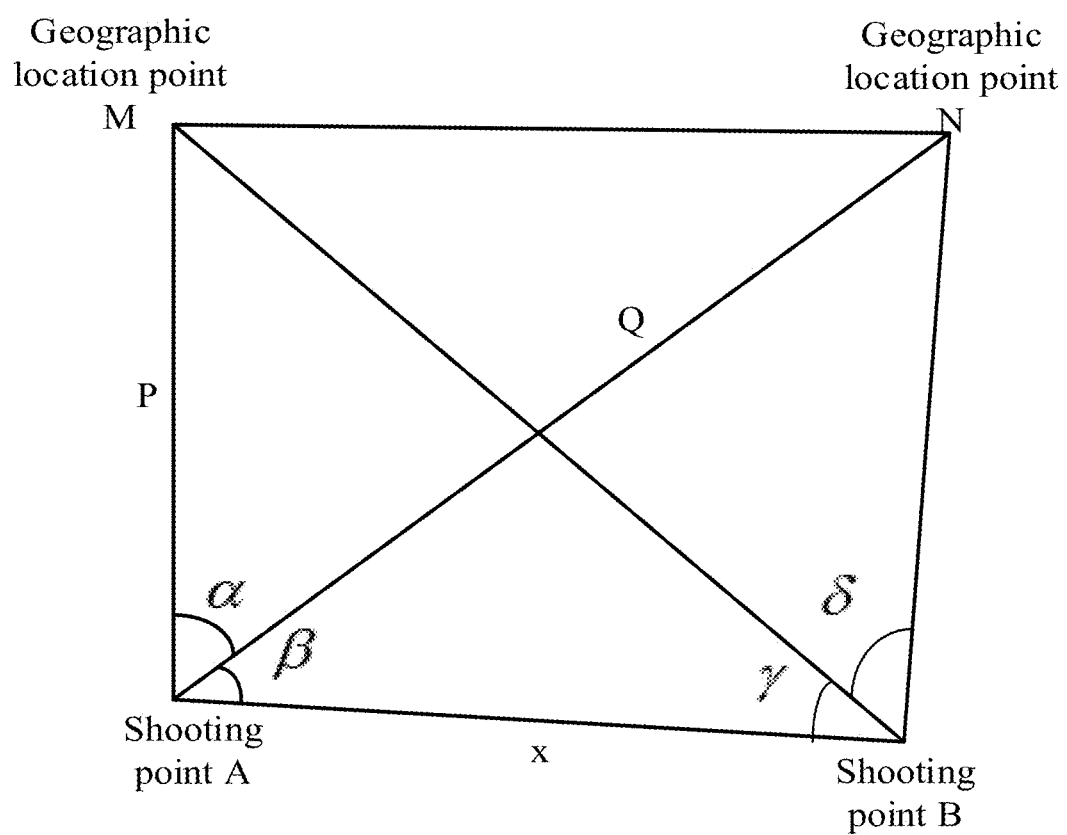
FIG. 5 is a schematic diagram of calculation of geographic location point coordinates by using shooting parameters according to Embodiment 3 of the present application.

Taking FIG. 5 as an example, it is assumed that two real-scene images shot by the same terminal device both include a geographic location point pair consisting of a geographic location point M and a geographic location point N. A corresponding shooting position coordinate in the first real-scene image is a shooting point A, and angles $\alpha$ and $\beta$ in the figure may be determined by shooting angles. A corresponding shooting position coordinate in the second real-scene image is a shooting point B, and angles $\gamma$ and $\delta$ in the figure may be determined by shooting angles. A distance x between the two shooting points may be obtained from positioning coordinates of the two real-scene images.

A distance P between the geographic location point M and the shooting point A and a distance Q between the geographic location point N and the shooting point A may be obtained according to the law of sines:

$$P = \frac{x\sin\gamma}{\sin(180 - \gamma - \alpha - \beta)}$$
$$Q = \frac{x\sin(\gamma + \delta)}{\sin(180 - \gamma - \delta - \beta)}$$

Coordinates of the two geographic location points can be determined according to the distance information, angle information, and positioning coordinates of the shooting points A and B.

In addition, it needs to be noted that since the same terminal device may shoot more than two real-scene images including the same geographic location point pair (M, N), a plurality of coordinates of the geographic location point s M and N can be determined by using pairwise real-scene images through the method in this step. In this case, coordinates of the geographic location point M can be obtained by processing the plurality of coordinates of the geographic location point M determined in such methods as averaging, calculating a cluster center, and calculating a median. Similarly, coordinates of the geographic location point N can be obtained by processing the plurality of coordinates of the geographic location point N determined in such methods as averaging, calculating a cluster center, and calculating a median.

In 413, a spatial relationship of the two geographic location points is determined based on the coordinates of the two geographic location points.

After the coordinates of the two geographic location points are obtained, a relative position relationship of the two geographic location points in space, such as a directional relationship and a distance relation, can be determined.

Information of the spatial relationship involved in the embodiment of the present application may include: types and values of the spatial relationship. The types of the spatial relationship mainly include some spatial relationship types in orientation, for example, east, south, west, north, southeast, northeast, southwest, northwest, left, right, upstairs, downstairs, and so on. The types of the spatial relationship are manually predefined, and a specific type of the spatial relationship between the two geographic location points is determined through the manner in the embodiment of the present application. The values may include values for distances, floors, and so on. For example, the type of the spatial relationship between the two geographic location points M and N is determined as: 20 meters to the east.

It can be seen that the determined spatial relationship of the geographic location points is relative. In the traditional prior art, the spatial relationship of the geographic location points is determined based on the positioning coordinates of the geographic location points. However, since the positioning coordinates of the two geographic location points may be positioned and reported by different terminal devices, an error of the positioning coordinates may seriously affect the spatial relationship between the geographic location points. However, in the present application, coordinates of the geographic location points are obtained from real-scene images shot by the same device. Even if there are errors in the shooting position coordinates positioned by the terminal devices, positioning errors of the two real-scene images shot by the same device are similar. Especially, the same device may be considered to have the same positioning error at shooting points close in distance, such as all are offset by 50 meters to the north. However, a relative position relationship of the two geographic location points determined from the real-scene images shot by the same device is relatively free of error because both have been offset by 50 meters to the west.

Besides, in this way, provided that terminal devices upload at least two real-scene images including the same geographic location point pair, a spatial relationship of two geographic location points in the geographic location point pair can be extracted, which, compared with the manner of manually labeling the spatial relationship in the traditional prior art, has a larger coverage and higher efficiency.

In 414, the spatial relationship of the geographic location points is stored and maintained in the form of a tetrad.

After the geographic location point spatial relationship is extracted through the method according to the embodiment of the present application, a tetrad format of <geographic location point 1, geographic location point 2, spatial relationship type, and spatial relationship value> can be adopted to make the expression of spatial relationship more standardized and unified and make systematic calculation, reasoning and storage of spatial relationship knowledge possible. For example, the spatial relationship is expressed as a tetrad R=<S, O, P, A>, wherein S and O are information of geographic location points, for example, unique IDs of the geographic location points can be adopted. P is a spatial relationship type, and A is a spatial relationship value.

The following application scenarios can be implemented through the method shown in the above embodiment:

A user inputs a query "Where is Tsinghua Science Park". If the following geographic location point spatial relationship, <Tsinghua Science Park, southeast gate of Tsinghua University, south, 100 meters>, through this spatial relationship, we can accurately give the answer "Tsinghua Science Park is 100 meters south to the southeast gate of Tsinghua University".

In addition, a spatial relationship of a new geographic location point pair may also be obtained by deduction based on a spatial relationship of a plurality of associated geographic location point pairs. For example, if there are the following geographic location point spatial relationships: <Tsinghua Science Park, southeast gate of Tsinghua University, south, 100 meters> and <Huaqing Garden, Tsinghua Science and Technology Park, south, 200 meters>, it can be deduced that: <Huaqing Jiayuan, southeast gate of Tsinghua University, south, 300 meters>. When a user inputs a query "Where is Huaqing Jiayuan", the answer "Huaqing Jiayuan is 300 meters south to the southeast gate of Tsinghua University" can be returned to the user.

The above is detailed description of the method according to the present application. An apparatus according to the present application is described in detail below with reference to Embodiment 4.

Figure 6:
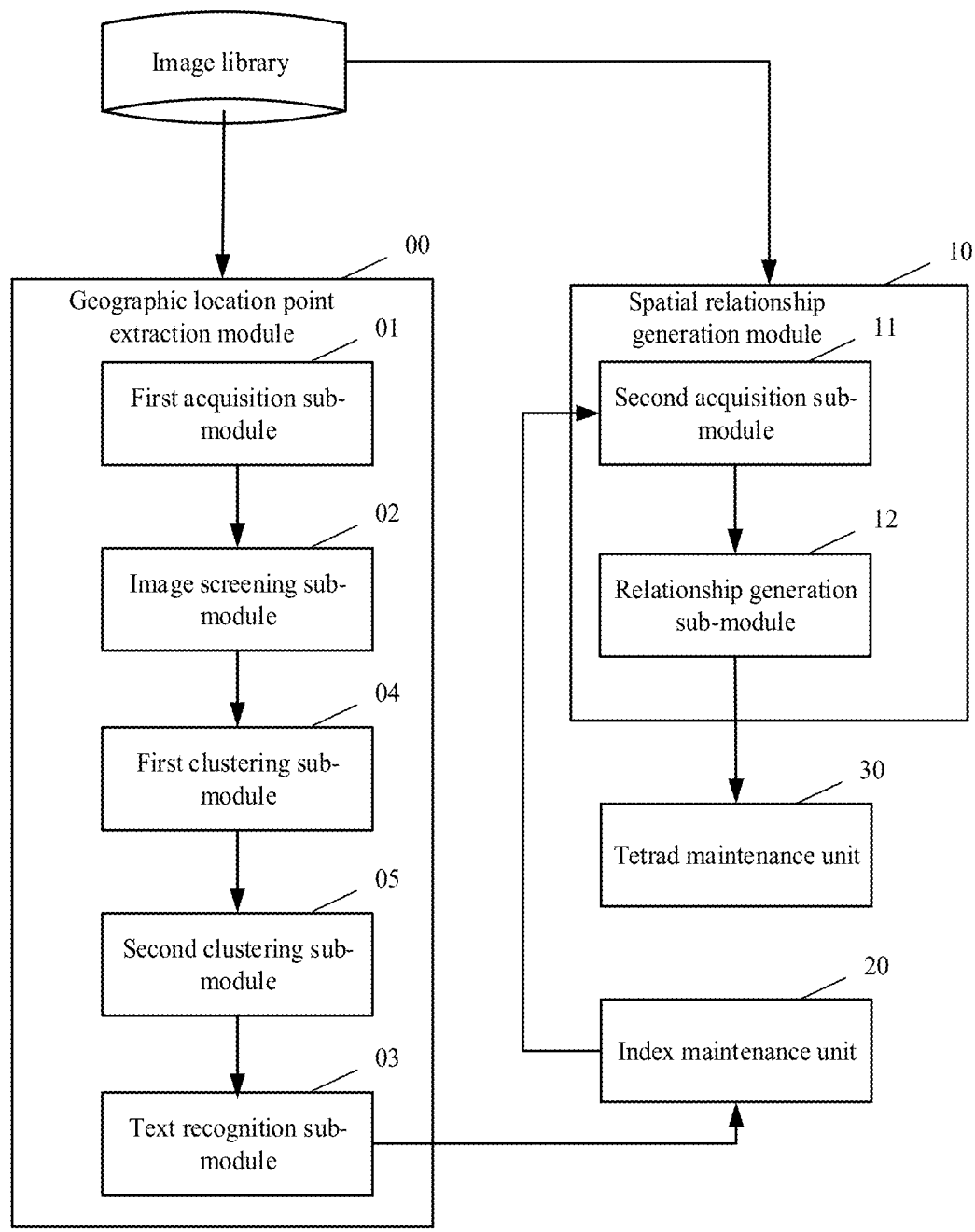
FIG. 6 is a structural diagram of an apparatus according to Embodiment 4 of the present application.

FIG. 6 is a structural diagram of an apparatus according to Embodiment 4 of the present application. The apparatus may be a server-side application or may be a functional unit such as a plug-in or a Software Development Kit (SDK) in a server-side application, or may be located in a computer system, which is not specifically limited in the embodiment of the present application. As shown in FIG. 6, the apparatus may include: a geographic location point extraction module 00 and a spatial relationship generation module 10, and may further include an index maintenance unit 20 and a tetrad maintenance unit 30. Main functions of the component modules are as follows:

The geographic location point extraction module 00 is configured to determine geographic location point pairs included in real-scene images by performing signboard recognition on the real-scene images collected by terminal devices.

The spatial relationship generation module 10 is configured to acquire at least two real-scene images collected by the same terminal device and including the same geographic location point pair; and determine a spatial relationship of the same geographic location point pair by using shooting parameters of the at least two real-scene images.

Specifically, the geographic location point extraction module 00 may include: a first acquisition sub-module 01, an image screening sub-module 02 and a text recognition sub-module 03, and may further include a first clustering sub-module 04 and a second clustering sub-module 05.

The first acquisition sub-module 01 is configured to acquire the real-scene images collected by the terminal devices.

Real-scene images collected and reported by the terminal devices may be stored in an image library. The image library is the basis of extracting the geographic location point spatial relationship in the present application. Some of the real-scene images stored in the image library have shooting parameters, some do not have shooting parameters, some may have part of the shooting parameters, and so on. In the present embodiment, real-scene images used by the geographic location point extraction module 00 have at least positioning coordinate information of the real-scene images, and may be further required to have shooting time information. The real-scene images acquired by the spatial relationship generation module 10 may be required to further have information such as shooting angles.

The image screening sub-module 02 is configured to perform signboard discrimination on the real-scene images to screen out real-scene images including at least two signboards.

When signboard discrimination is performed on the real-scene images, a pre-trained signboard discrimination model may be used. Firstly, the real-scene images are regionally classified. Since signboards in the real-scene images are respectively a closed region in general, the real-scene images can be regionally recognized and classified. A determined closed region is input to the signboard discrimination model, and the signboard discrimination model outputs a discrimination result indicating whether the closed region is a signboard area.

The signboard discrimination model is actually a classification model. Some real-scene images can be pre-collected to mark signboard areas and non-signboard areas as positive and negative samples respectively, and then the signboard discrimination model can be obtained by training the classification model.

The text recognition sub-module 03 is configured to perform signboard text recognition on the real-scene images including at least two signboards to determine geographic location point pairs included in the real-scene images.

Preferably, the first clustering sub-module 04 is configured to cluster, based on a positioning distance among the real-scene images, the real-scene images including at least two signboards screened out by the image screening sub-module 02, to obtain more than one similar positioning class cluster.

The second clustering sub-module 05 is configured to further cluster images in the similar positioning class cluster based on content similarity respectively, to obtain more than one similar content class cluster.

Similarity among images may be calculated based on features of the images. For example, rotation-invariant and scale-invariant features may be extracted from the images by using, such as, Harris Corner, a Scale-invariant feature transform (SIFT) algorithm, or a Speeded Up Robust Features (SURF) algorithm. Then, the similarity among the features is determined by calculating similarity among the extracted features. The images meeting requirements of the similarity are clustered into one class.

In some cases, geographic location points may change over time, for example, the opening of certain stores, the relocation of certain stores, and so on. In order to ensure that acquired geographic location point information is up-to-date, the second clustering sub-module 05 may classify the images in the similar positioning class cluster respectively according to shooting time, to obtain images shot in each time period; select images shot in the most recent time period; and cluster the images shot in the most recent time period in the same similar positioning class cluster based on content similarity.

The text recognition sub-module 03 is specifically configured to perform the signboard text recognition on real-scene images in the similar content class cluster respectively.

Specifically, when performing signboard text recognition on the real-scene images including at least two signboards, the text recognition sub-module 03 may perform signboard discrimination on the real-scene images including at least two signboards, to determine signboard areas; perform ID uniqueness processing on the determined signboard areas in the real-scene images, such that signboard areas referring to the same signboard in the real-scene images use the same ID; determine signboard area ID sequences included in the real-scene images and acquire a frequent item sequence therefrom; and perform text recognition on signboard areas corresponding to IDs in the frequent item sequence.

If a plurality of text recognition results are recognized for signboard areas corresponding to the same ID in the frequent item sequence, the text recognition sub-module 03 may select one with the highest confidence from the plurality of text recognition results.

As one preferred implementation, when determining the geographic location point pairs included in the real-scene images, the text recognition sub-module 03 may select, for real-scene images including frequent item sequences, n−1 geographic location point pairs from the frequent item sequences, a set of the n−1 geographic location point pairs includes geographic location points corresponding to all IDs in the frequent item sequences, the sum of signboard distances corresponding to the geographic location point pairs in the real-scene images is minimum, and the n is the number of signboards included in the frequent item sequences.

The index maintenance unit 20 is configured to establish reverse indexes of the real-scene images by using the geographic location point pairs.

The spatial relationship generation module 10 may specifically include: a second acquisition sub-module 11 and a relationship generation sub-module 12.

The second acquisition sub-module 11 is configured to query the reverse indexes to perform the acquiring at least two real-scene images collected by the same terminal device and including the same geographic location point pair.

The relationship generation sub-module 12 is configured to perform geometrical relationship-based calculation by using positioning coordinates of the at least two real-scene images and shooting angles for signboards of the geographic location point pair, to obtain coordinates of two geographic location points in the geographic location point pair; and determine a spatial relationship of the two geographic location points based on the coordinates of the two geographic location points.

The tetrad maintenance unit 30 is configured to store the spatial relationship of the two geographic location points in the form of a tetrad; wherein the tetrad includes: information of the two geographic location points, a spatial relationship type and a spatial relationship value.

Information of the spatial relationship may include: types and values of the spatial relationship. The types of the spatial relationship mainly include some spatial relationship types in orientation, for example, east, south, west, north, southeast, northeast, southwest, northwest, left, right, upstairs, downstairs, and so on. The types of the spatial relationship are manually predefined, and a specific type of the spatial relationship between the two geographic location points is determined through the manner in the embodiment of the present application. The values may include values for distance, floors, and so on.

According to an embodiment of the present application, the present application further provides an electronic device and a readable storage medium.

Figure 7:
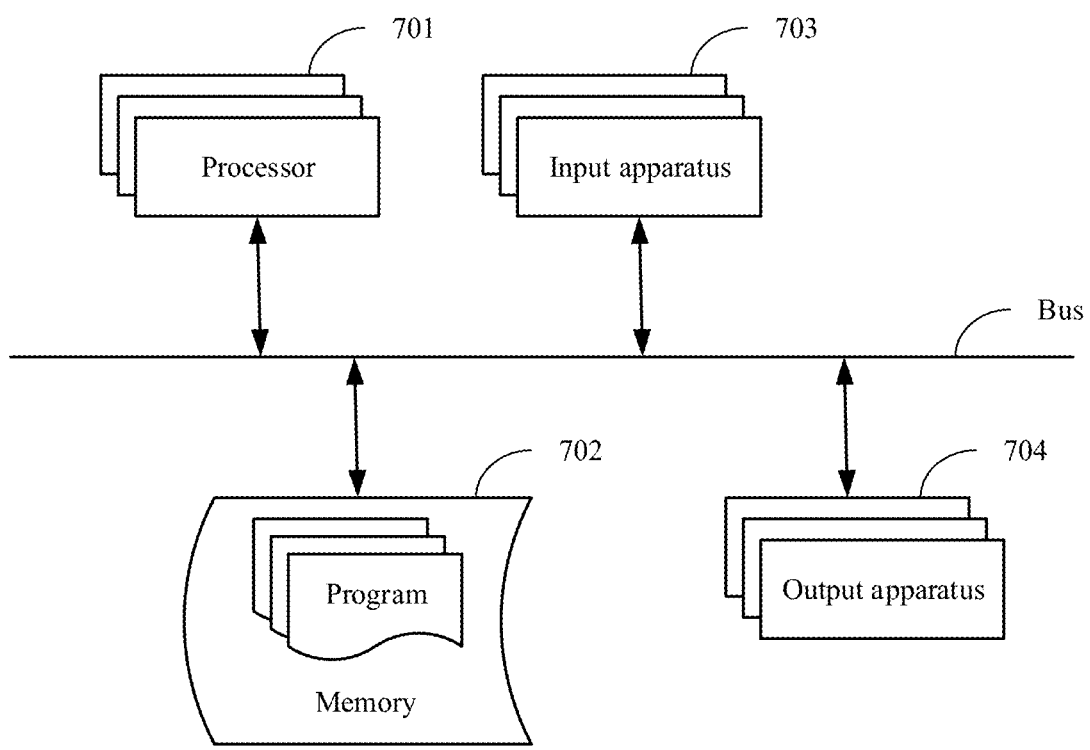
FIG. 7 is a block diagram of an electronic device configured to implement the method according to the embodiments of the present disclosure.

As shown in FIG. 7, it is a block diagram of an electronic device of a method for extracting a geographic location point spatial relationship according to an embodiment of the present application. The electronic device is intended to represent various forms of digital computers, such as laptops, desktops, workbenches, personal digital assistants, servers, blade servers, mainframe computers and other suitable computers. The electronic device may further represent various forms of mobile devices, such as personal digital assistant, cellular phones, smart phones, wearable devices and other similar computing devices. The components, their connections and relationships, and their functions shown herein are examples only, and are not intended to limit the implementation of the present application as described and/or required herein.

As shown in FIG. 7, the electronic device includes: one or more processors 701, a memory 702, and interfaces for connecting various components, including high-speed and low-speed interfaces. The components are connected to each other by using different buses and may be installed on a common motherboard or otherwise as required. The processor may process instructions executed in the electronic device, including instructions stored in the memory or on the memory to display graphical information of a graphical user interface (GUI) on an external input/output apparatus (such as a display device coupled to the interfaces). In other implementations, a plurality of processors and/or buses may be used together with a plurality of memories, if necessary. Similarly, a plurality of electronic devices may be connected, each of which provides some necessary operations (for example, as a server array, a set of blade servers, or a multiprocessor system). One processor 701 is taken as an example is FIG. 7.

The memory 702 is the non-instantaneous computer-readable storage medium according to the present application. The memory stores instructions executable by at least one processor to make the at least one processor perform the method for sorting geographic location points and the method for extracting a geographic location point spatial relationship according to the present application. The non-instantaneous computer-readable storage medium in the present application stores computer instructions. The computer instructions are used to make a computer perform the method for extracting a geographic location point spatial relationship according to the present application.

The memory 702, as a non-instantaneous computer-readable storage medium, may be configured to store non-instantaneous software programs, non-instantaneous computer executable programs and modules, for example, program instructions/modules corresponding to the method for extracting a geographic location point spatial relationship according to the present application. The processor 701 runs the non-instantaneous software programs, instructions and modules stored in the memory 702 to execute various functional applications and data processing of a server, that is, to implement the method for extracting a geographic location point spatial relationship according to the present application.

The memory 702 may include a program storage area and a data storage area. The program storage area may store an operating system and an application required by at least one function; and the data storage area may store data created according to use of the electronic device. In addition, the memory 702 may include a high-speed random access memory, and may further include a non-instantaneous memory, for example, at least one disk storage device, a flash memory device, or other non-instantaneous solid-state storage devices. In some embodiments, the memory 702 optionally includes memories remotely disposed relative to the processor 701. The remote memories may be connected to the electronic device over a network. Examples of the network include, but are not limited to, the Internet, intranets, local area networks, mobile communication networks and combinations thereof.

The electronic device may further include: an input apparatus 703 and an output apparatus 704. The processor 701, the memory 702, the input apparatus 703 and the output apparatus 704 may be connected through a bus or in other manners. In FIG. 7, the connection through a bus is taken as an example.

The input apparatus 703 may receive input numerical information or character information, and generate key signal input related to user setting and function control of the electronic device, for example, input apparatuses such as a touch screen, a keypad, a mouse, a trackpad, a touch pad, a pointer, one or more mouse buttons, a trackball, and a joystick. The output apparatus 704 may include a display device, an auxiliary lighting device (e.g., an LED) and a tactile feedback device (e.g., a vibration motor). The display device may include, but is not limited to, a liquid crystal display (LCD), a light-emitting diode (LED) display and a plasma display. In some implementations, the display device may be a touch screen.

Various implementations of the systems and technologies described herein may be implemented in a digital electronic circuit system, an integrated circuit system, a dedicated ASIC (application-specific integrated circuit), computer hardware, firmware, software, and/or combinations thereof. The various implementations may include: being implemented in one or more computer programs, wherein the one or more computer programs may be executed and/or interpreted on a programmable system including at least one programmable processor, and the programmable processor may be a special-purpose or general-purpose programmable processor, receive data and instructions from a storage system, at least one input apparatus and at least one output apparatus, and transmit the data and the instructions to the storage system, the at least one input apparatus and the at least one output apparatus.

The computing programs (also referred to as programs, software, software applications, or code) include machine instructions for programmable processors, and may be implemented by using high-level procedural and/or object-oriented programming languages, and/or assembly/machine languages. As used herein, the terms "machine-readable medium" and "computer-readable medium" refer to any computer program product, device, and/or apparatus (e.g., a magnetic disk, an optical disc, a memory, and a programmable logic device (PLD)) configured to provide machine instructions and/or data to a programmable processor, including a machine-readable medium that receives machine instructions serving as machine-readable signals. The term "machine-readable signal" refers to any signal for providing the machine instructions and/or data to the programmable processor.

To provide interaction with a user, the systems and technologies described here can be implemented on a computer. The computer has: a display device (e.g., a CRT (cathode-ray tube) or an LCD (liquid crystal display) monitor) for displaying information to the user; and a keyboard and pointing device (e.g., a mouse or trackball) through which the user may provide input for the computer. Other kinds of apparatuses may also be configured to provide interaction with the user. For example, a feedback provided for the user may be any form of sensory feedback (for example, visual, auditory, or tactile feedback); and input from the user may be received in any form (including sound input, voice input, or tactile input).

The systems and technologies described herein can be implemented in a computing system including background components (for example, as a data server), or a computing system including middleware components (for example, an application server), or a computing system including front-end components (for example, a user computer with a graphical user interface or webpage browser through which the user can interact with the implementation mode of the systems and technologies described here), or a computing system including any combination of such background components, middleware components or front-end components. The components of the system can be connected to each other through any form or medium of digital data communication (for example, a communication network). Examples of the communication network include: a local area network (LAN), a wide area network (WAN), and the Internet.

The computer system may include a client and a server. The client and the server are generally far away from each other and generally interact via the communication network. A relationship between the client and the server is generated through computer programs that run on a corresponding computer and have a client-server relationship with each other.

It shall be understood that the steps can be reordered, added, or deleted using the various forms of processes shown above. For example, the steps described in the present application may be executed in parallel or sequentially or in different sequences, provided that desired results of the technical solutions disclosed in the present application are achieved, which is not limited herein.

The above specific implementations do not limit the extent of protection of the present application. Those skilled in the art should understand that various modifications, combinations, sub-combinations, and replacements can be made according to design requirements and other factors. Any modifications, equivalent substitutions and improvements made within the spirit and principle of the present application all should be included in the extent of protection of the present application.

What is claimed is:
1. A method for extracting a geographic location point spatial relationship, comprising:
   determining geographic location point pairs comprised in real-scene images by performing signboard recognition on the real-scene images collected by terminal devices;
   acquiring at least two real-scene images collected by the same terminal device and comprising the same geographic location point pair; and
   determining a spatial relationship of the same geographic location point pair by using shooting parameters of the at least two real-scene images,
   wherein the determining geographic location point pairs comprised in real-scene images by performing signboard recognition on the real-scene images collected by terminal devices comprises:
   acquiring the real-scene images collected by the terminal devices;
   performing signboard discrimination on the real-scene images to screen out real-scene images comprising at least two signboards; and
   performing signboard text recognition on the real-scene images comprising at least two signboards to determine geographic location point pairs comprised in the real-scene images, wherein before the performing signboard text recognition on the real-scene images comprising at least two signboards, the method further comprises:

clustering, based on a positioning distance among the real-scene images, the screened out real-scene images comprising at least two signboards, to obtain more than one similar positioning class cluster;

further clustering images in the similar positioning class cluster based on content similarity respectively, to obtain more than one similar content class cluster; and performing the signboard text recognition on real-scene images in the similar content class cluster respectively, wherein the further clustering images in the similar positioning class cluster based on content similarity respectively comprises:

classifying the images in the similar positioning class cluster respectively according to shooting time, to obtain images shot in each time period;

selecting images shot in the most recent time period; and clustering the images shot in the most recent time period in the same similar positioning class cluster based on content similarity.

2. The method according to claim 1, wherein the performing signboard text recognition on the real-scene images comprising at least two signboards comprises:

performing signboard discrimination on the real-scene images comprising at least two signboards, to determine signboard areas;

performing ID uniqueness processing on the determined signboard areas in the real-scene images, such that signboard areas referring to the same signboard in the real-scene images use the same ID;

determining signboard area ID sequences comprised in the real-scene images and acquiring a frequent item sequence therefrom; and performing text recognition on signboard areas corresponding to IDs in the frequent item sequence.

3. The method according to claim 2, wherein the performing text recognition on signboard areas corresponding to IDs in the frequent item sequence comprises:

selecting, if a plurality of text recognition results are recognized for signboard areas corresponding to the same ID in the frequent item sequence, one with the highest confidence from the plurality of text recognition results.

4. The method according to claim 2, wherein the determining geographic location point pairs comprised in the real-scene images comprises:

selecting, for real-scene images comprising frequent item sequences, n−1 geographic location point pairs from the frequent item sequences, a set of the n−1 geographic location point pairs comprising geographic location points corresponding to all IDs in the frequent item sequences, the sum of signboard distances corresponding to the geographic location point pairs in the real-scene images being minimum, and the n being the number of signboards comprised in the frequent item sequences.

5. The method according to claim 1, wherein after the determining geographic location point pairs comprised in the real-scene images, the method further comprises:

establishing reverse indexes of the real-scene images by using the geographic location point pairs; and querying the reverse indexes to perform the acquiring at least two real-scene images collected by the same terminal device and comprising the same geographic location point pair.

6. The method according to claim 1, wherein the determining a spatial relationship of the same geographic location point pair by using shooting parameters of the at least two real-scene images comprises:

performing geometrical relationship-based calculation by using positioning coordinates of the at least two real-scene images and shooting angles for signboards of the geographic location point pair, to obtain coordinates of two geographic location points in the geographic location point pair; and determining a spatial relationship of the two geographic location points based on the coordinates of the two geographic location points.

7. The method according to claim 1, further comprising:

storing the spatial relationship of the two geographic location points in the form of a tetrad;

wherein the tetrad comprises: information of the two geographic location points, a spatial relationship type and a spatial relationship value.

8. An electronic device, comprising:

at least one processor; and a memory communicatively connected with the at least one processor;

wherein the memory stores instructions executable by the at least one processor, and the instructions are executed by the at least one processor to enable the at least one processor to perform a method for extracting a geographic location point spatial relationship, wherein the method comprises:

determining geographic location point pairs comprised in real-scene images by performing signboard recognition on the real-scene images collected by terminal devices;

acquiring at least two real-scene images collected by the same terminal device and comprising the same geographic location point pair; and determining a spatial relationship of the same geographic location point pair by using shooting parameters of the at least two real-scene images, wherein determining geographic location point pairs comprised in real-scene images by performing signboard recognition on the real-scene images collected by terminal devices comprises:

acquiring the real-scene images collected by the terminal devices;

performing signboard discrimination on the real-scene images to screen out real-scene images comprising at least two signboards; and performing signboard text recognition on the real-scene images comprising at least two signboards to determine geographic location point pairs comprised in the real-scene images, wherein before the performing signboard text recognition on the real-scene images comprising at least two signboards, the method further comprises:

clustering, based on a positioning distance among the real-scene images, the screened out real-scene images comprising at least two signboards, to obtain more than one similar positioning class cluster;

further clustering images in the similar positioning class cluster based on content similarity respectively, to obtain more than one similar content class cluster; and performing the signboard text recognition on real-scene images in the similar content class cluster respectively, wherein the further clustering images in the similar positioning class cluster based on content similarity respectively comprises:

classifying the images in the similar positioning class cluster respectively according to shooting time, to obtain images shot in each time period;

selecting images shot in the most recent time period; and clustering the images shot in the most recent time period in the same similar positioning class cluster based on content similarity.

9. The electronic device according to claim 8, wherein the performing signboard text recognition on the real-scene images comprising at least two signboards comprises:

performing signboard discrimination on the real-scene images comprising at least two signboards, to determine signboard areas;

performing ID uniqueness processing on the determined signboard areas in the real-scene images, such that signboard areas referring to the same signboard in the real-scene images use the same ID;

determining signboard area ID sequences comprised in the real-scene images and acquire a frequent item sequence therefrom; and performing text recognition on signboard areas corresponding to IDs in the frequent item sequence.

10. The electronic device according to claim 9, wherein the determining geographic location point pairs comprised in the real-scene images comprises:

selecting, for real-scene images comprising frequent item sequences, n−1 geographic location point pairs from the frequent item sequences, a set of the n−1 geographic location point pairs comprising geographic location points corresponding to all IDs in the frequent item sequences, the sum of signboard distances corresponding to the geographic location point pairs in the real-scene images being minimum, and the n being the number of signboards comprised in the frequent item sequences.

11. The electronic device according to claim 8, wherein after the determining geographic location point pairs comprised in the real-scene images, the method further comprises: establishing reverse indexes of the real-scene images by using the geographic location point pairs; and querying the reverse indexes to perform the acquiring at least two real-scene images collected by the same terminal device and comprising the same geographic location point pair.

12. The electronic device according to claim 8, wherein the determining a spatial relationship of the same geographic location point pair by using shooting parameters of the at least two real-scene images comprises:

performing geometrical relationship-based calculation by using positioning coordinates of the at least two real-scene images and shooting angles for signboards of the geographic location point pair, to obtain coordinates of two geographic location points in the geographic location point pair; and determining a spatial relationship of the two geographic location points based on the coordinates of the two geographic location points.

13. The electronic device according to claim 8, further comprising:

storing the spatial relationship of the two geographic location points in the form of a tetrad;

wherein the tetrad comprises: information of the two geographic location points, a spatial relationship type and a spatial relationship value.

14. A non-transitory computer readable storage medium with computer instructions stored thereon, wherein the computer instructions are used for causing a computer to perform a method for extracting a geographic location point spatial relationship, wherein the method comprises:

determining geographic location point pairs comprised in real-scene images by performing signboard recognition on the real-scene images collected by terminal devices;

acquiring at least two real-scene images collected by the same terminal device and comprising the same geographic location point pair; and determining a spatial relationship of the same geographic location point pair by using shooting parameters of the at least two real-scene images, wherein the determining geographic location point pairs comprised in real-scene images by performing signboard recognition on the real-scene images collected by terminal devices comprises:

acquiring the real-scene images collected by the terminal devices;

performing signboard discrimination on the real-scene images to screen out real-scene images comprising at least two signboards; and performing signboard text recognition on the real-scene images comprising at least two signboards to determine geographic location point pairs comprised in the real-scene images, wherein before the performing signboard text recognition on the real-scene images comprising at least two signboards, the method further comprises:

clustering, based on a positioning distance among the real-scene images, the screened out real-scene images comprising at least two signboards, to obtain more than one similar positioning class cluster;

further clustering images in the similar positioning class cluster based on content similarity respectively, to obtain more than one similar content class cluster; and performing the signboard text recognition on real-scene images in the similar content class cluster respectively, wherein the further clustering images in the similar positioning class cluster based on content similarity respectively comprises:

classifying the images in the similar positioning class cluster respectively according to shooting time, to obtain images shot in each time period;

selecting images shot in the most recent time period; and clustering the images shot in the most recent time period in the same similar positioning class cluster based on content similarity.

* * * * *